United States Patent
Jones et al.

(10) Patent No.: US 6,410,614 B1
(45) Date of Patent: *Jun. 25, 2002

(54) INCORPORATING TITANIUM DIOXIDE IN POLYMERIC MATERIALS

(75) Inventors: Frank R. Jones, Asheville; Stanley A. McIntosh, Candler; Raymond L. Denney, Canton, all of NC (US)

(73) Assignee: BASF Corpotation, Mt. Olive, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/519,061

(22) Filed: Mar. 3, 2000

(51) Int. Cl.⁷ .................................................. C08K 9/00
(52) U.S. Cl. ........................................ 523/205; 524/497
(58) Field of Search .......................................... 523/205

(56) References Cited

U.S. PATENT DOCUMENTS

| | | | |
|---|---|---|---|
| 3,608,062 A | * 9/1971 | Alfes ........................... 424/22 |
| 3,649,321 A | * 3/1972 | Durrant ........................ 106/300 |
| 3,846,360 A | 11/1974 | Needham ................... 260/23.7 |
| 4,054,498 A | * 10/1977 | Tarwid .................. 204/159.11 |
| 4,168,180 A | 9/1979 | Peabody ..................... 106/308 |
| 4,388,425 A | 6/1983 | Strehler et al. .............. 523/333 |
| 4,474,681 A | 10/1984 | Belde et al. ................. 252/314 |
| 4,710,535 A | 12/1987 | Perrot et al. ................ 524/413 |
| 5,137,369 A | 8/1992 | Hodan ......................... 366/340 |
| 5,162,074 A | 11/1992 | Hills ........................... 156/644 |
| 5,236,645 A | 8/1993 | Jones et al. |
| 5,393,510 A | 2/1995 | Blumel et al. .............. 423/610 |
| 5,427,771 A | * 6/1995 | Grollier ....................... 424/59 |
| 5,453,267 A | * 9/1995 | Kemp .......................... 424/59 |
| 5,480,482 A | * 1/1996 | Novinson .................... 106/498 |
| 5,567,754 A | * 10/1996 | Stramel ....................... 524/308 |
| 5,789,528 A | * 8/1998 | Martl .......................... 528/279 |
| 5,800,746 A | 9/1998 | Jones et al. ................... 264/13 |
| 5,833,893 A | 11/1998 | Jones et al. ................... 264/13 |
| 5,834,089 A | 11/1998 | Jones et al. .................. 428/97 |
| 5,837,049 A | * 11/1998 | Watson ....................... 106/427 |
| 5,869,551 A | 2/1999 | Caswell et al. ............. 523/351 |
| 5,889,089 A | 3/1999 | Caswell et al. ............. 523/205 |
| 5,955,516 A | 9/1999 | Caswell et al. ............. 523/203 |
| 6,083,490 A | * 7/2000 | Ellis ............................ 424/59 |
| 6,093,270 A | * 7/2000 | Ferencz ..................... 156/73.5 |

* cited by examiner

*Primary Examiner*—Paul R. Michl
(74) *Attorney, Agent, or Firm*—Nixon & Vanderhye P.C.

(57) ABSTRACT

A concentrate containing titanium dioxide is made by employing a carrier that is a liquid below about 25° C. and which has ester functionality. The concentrate may be added directly to a host polymer to provide a high concentration of titanium dioxide without causing processing interruptions. Milling of the concentration is unnecessary.

30 Claims, No Drawings

US 6,410,614 B1

INCORPORATING TITANIUM DIOXIDE IN POLYMERIC MATERIALS

CROSS-REFERENCE TO RELATED APPLICATIONS

This application is related to, and claims domestic priority benefits under 35 USC Section 120 from commonly owned U.S. patent application Ser. No. 09/075,169, filed May 11, 1998, U.S. Pat. No. 6,232,371, which is a continuation in part of U.S. Pat. Nos. 5,869,551; 5,889,089; 5,955,516; 5,800,746; 5,833,893; and 5,834,089, each of which was filed in the United States Patent and Trademark Office on Mar. 3, 1997, and each claiming domestic priority benefits under 35 USC Section 119(e) from U.S. Provisional Application No. 60/012,794 filed on Mar. 4, 1996.

FIELD OF THE INVENTION

The present invention relates generally to the field of thermoplastic polymeric materials containing titanium dioxide ($TiO_2$). In preferred exemplary embodiments, the present invention relates to synthetic filament containing $TiO_2$ and to methods for incorporating $TiO_2$ in melt flows of filament-forming thermoplastic polymeric materials prior to melt-spinning to form synthetic filaments therefrom.

BACKGROUND OF THE INVENTION

The incorporation of additives, including $TiO_2$, into thermoplastic polymeric host materials is known. $TiO_2$ is commonly added to fibers and other thermoplastic materials as a delusterant. Thus, the art has conventionally incorporated colorants, stabilizers, delusterants (such as $TiO_2$), flame retardants, fillers, antimicrobial agents, antistatic agents, optical brighteners, extenders, processing aids and other functional additives into polymeric host materials in an effort to "engineer" desired properties of the resulting additive-containing polymeric host material. Such additives are typically added any time prior to shaping of the polymeric material, for example, by spinning or molding (e.g., extrusion, injection, or blow-molding) operations.

The incorporation of $TiO_2$ in filaments formed by melt-spinning a polymeric material has presented unique challenges. For example, the amount of $TiO_2$ is typically dispersed in a concentrate in the form of a solid chip which is added to the polymeric material. The concentrate usually is composed of the $TiO_2$ in a carrier. It is important for optimal performance that the carrier is compatible with the host thermoplastic material. It is also important that the concentration of the $TiO_2$ is sufficiently high to impart the intended result (such as white color, delustering, etc.) but not so high as to interrupt the spinning process, especially when the carrier is not compatible with the thermoplastic host.

Liquid (i.e., paste) $TiO_2$ concentrates are known. Commercial white pastes are typically prepared with mineral oil as the carrier. Mineral oil does not disperse well into polar polymers like nylons during extrusion. (As used herein, the term "paste" refers to a concentrate which has a smooth, viscous, but flowable or pumpable, nature at room temperature.)

U.S. Pat. No. 3,846,360 to Needham describes color concentrates, including $TiO_2$ concentrates, that comprise a least a minor amount of certain solution-polymerized hydrocarbons and which allegedly exhibit compatibility in a wide range plastic materials. Exemplary concentrates contain $TiO_2$, a carrier (elastomeric), an extender oil (petroleum oil), and an optional binder, such as homopolymers or copolymers of monoolefins.

U.S. Pat. No. 4,168,180 to Peabody describes pigment concentrates which contain by weight about 35 to about 60% of organic pigments and about 5 to about 55% of certain low molecular weight, friable polymers of styrene and/or alkyl substituted styrenes; or about 45 to about 90% of inorganic pigments (such as $TiO_2$) and about 5 to about 55% of the friable polymer. A dispersing agent is optional and, if present, the weight ratio of polymer to dispersing agent is at least 1. Suitable dispersing agents include caprolactone.

U.S. Pat. No. 4,388,425 to Strehler describes $TiO_2$ concentrates that are formulated for incorporation into caprolactam or polycaprolactam melt. The concentrate contains $TiO_2$ and caprolactam, and is described as omitting water. However, up to 10% by weight of water is disclosed as being present.

U.S. Pat. No. 4,474,681 to Belde et al. describes an aqueous suspension of $TiO_2$ and caprolactam which is useful for delustering polycaprolactam.

U.S. Pat. No. 4,710,535 to Perrot et al. describes concentrates ("masterbatches") for delustering polyamides which contain a copolyamide of hexamethylene adipamide and caproamide units. Anatase $TiO_2$ coated with silica and alumina and treated with polydimethylsiloxane is present in the masterbatch as the delustering agent.

U.S. Pat. No. 5,393,510 to Blumel et al. describes a thixotropic $TiO_2$ suspension. The suspension contains $TiO_2$ at a 75% by weight or greater. A dispersing agent is also present as about 0.1 to 5% by weight of the aqueous suspension. The suspension is taught to have particular application to the paper making industry.

U.S. Pat. No. 5,837,049 to Watson et al. describes a masterbatch of an inorganic solid (such as $TiO_2$). The inorganic solid is coated with certain alkylphosphonic acids or esters of alkylphosphonic acid. The Treated inorganic solids may be used in a masterbatch where the carrier is one of several listed polymers but, preferably, polyethylene or polypropylene.

SUMMARY OF THE INVENTION

It is an object of the present invention to provide a high solids $TiO_2$ concentrate that is compatible with nylon.

Another object of the present invention is a $TiO_2$ concentrate that is suitable for use in thermoplastic fibers.

Yet another object is a to provide a $TiO_2$ concentrate which is economical to make compared to existing concentrates.

Still another object of the present invention is to provide a $TiO_2$ concentrate which dispersed readily into the host polymer.

A further object of the present invention is process for making a $TiO_2$ concentrate which concentrate has a good particle size distribution without requiring milling.

The present invention achieves these and other objectives in a composition consisting essentially of up to about 70 wt. % titanium dioxide, a carrier that is a liquid below about 25° C. and which has ester functionality, from 0 to about 5 wt % water, and optionally, one or more dispersants.

The present invention is embodied also in a method of making a titanium dioxide concentrate by $TiO_2$ having a mean particle size not exceeding 6 microns with carrier that is a liquid below about 25° C. and which has ester functionality and optionally, one or more dispersants. In this method milling is not necessary, and it is preferred to not mill the concentrate as doing so is unnecessary and would merely complicate the production process.

In another embodiment, the invention involves a method of making filaments containing titanium dioxide by supplying a melt flow of a melt-spinnable polymeric host material to spinneret orifices; incorporating within at least a portion of the melt flow of polymeric host material upstream of the spinneret orifices, a concentrate consisting essentially of titanium dioxide dispersed in a polymeric carrier that is a liquid at about 25° C. and which contains less than 5% by weight water and, optionally, a dispersant, to form a mixture of the polymeric host material and the titanium dioxide; and then extruding a melt of the mixture through the spinneret orifices to form filaments containing titanium dioxide. Again, it is not necessary, or desirable to mill the concentrate before adding it to the polymeric host material.

The invention also involves a method of making titanium dioxide containing polymer compositions in general. This method involves introducing a concentrate consisting essentially of up to 60% by weight titanium dioxide; a polymeric carrier that is a liquid at about 25° C.; from 0 to about 5% water; and, optionally, a dispersant, into a polymeric host material; and dispersing the concentrate into the polymeric host material to form a titanium dioxide-containing polymer composition.

These and other aspects and advantages of this invention will become more clear after careful consideration is given to the following detailed description of the preferred exemplary embodiments thereof.

DETAILED DESCRIPTION OF THE PREFERRED EMBODIMENTS

To promote an understanding of the principles of the present invention, descriptions of specific embodiments of the invention follow and specific language describes the same. It will nevertheless be understood that no limitation of the scope of the invention is thereby intended, and that such alterations and further modifications, and such further applications of the principles of the invention as discussed are contemplated as would normally occur to one ordinarily skilled in the art to which the invention pertains.

In describing the present invention, it is believed that reference to a specific end use for the inventive concentrate and process of making it will assist the reader in understanding the invention in a context. Such context should not be deemed limiting, however, and other applications concentrates of the invention should be considered within the fair scope. Thus, for example, while reference has been, and will hereinafter be, made to melt-spinning of filaments, it will be understood that other operations which serve to shape a melt of a polymeric material to a final form (e.g., extrusion or injection molding, blow-molding or the like) are contemplated.

The host polymer in which the additive concentrate system of this invention may be incorporated includes any synthetic thermoplastic polymer which is melt-spinnable. Exemplary polymers are polyamides such as poly (hexamethylene adipamide), polycaprolactam and polyamides of bis(4-aminocyclohexyl) methane and linear aliphatic dicarboxylic acids containing 9, 10 and 12 carbon atoms; copolyamides; polyester such as poly(ethylene) terephthalic acid and copolymers thereof; polyolefins such as polyethylene and polypropylene; and polyurethanes. Both heterogeneous and homogeneous mixtures of such polymers may also be used. Presently, the concentrate is preferably used in polycaprolactam (i.e., nylon 6) or poly (hexamethylene adipamide) (i.e., nylon 6,6).

The concentrate of the present invention contains $TiO_2$. It is presently preferred that the $TiO_2$ has a mean particle size of less than about 6 microns, more preferably less than about 2, and most preferably less than about 1 micron. The preferred upper limit of particle size is currently about 0.5 microns. The $TiO_2$ may be of the rutile or anatase variety. In the concentrate paste of the present invention, the $TiO_2$ is preferably present at least about 55% by weight and more preferably at about 60% by weight. Concentrations up to about 70% or even higher are possible with the present invention as long as the paste is sufficiently flowable (i.e., the viscosity is not too great) to be added to the host polymer without significant heating or other handling. The present invention permits these high loadings of $TiO_2$ without compromising the flowability or particle size distribution. Surprisingly, the concentrate of the present invention does not exhibit agglomeration of the $TiO_2$ It is believed that the carrier used in the present invention wets the surface of the $TiO_2$ particles very well.

As an aid to dispersion of the concentrate in the host polymer or simply to facilitate water clean up of the concentrate, the concentrate of the present invention may optionally contain one or more dispersants. Suitable dispersants include ethoxylated fatty alcohols; polyoxypropylene/ethylene block copolymers (e.g., Pluronic® 25R2 available from BASF Corporation of Mt. Olive, N.J.); ethoxylated nonylphenol; (polyethylene glycol) p-octyl phenyl ether (e.g., Triton® X-100 available from Rohm and Haas); alkoxylated diamines (Tetronic® 150R1); sodium lauryl sulfate and cationic dispersants (VariQuat®). When present, the dispersant should not exceed 25% by weight of the concentrate.

Water is preferably absent from the concentrate of the present invention. Some water may be present without reducing the benefits observed. In any case, there should be no more than about 5% by weight water present in the concentrate.

The balance of the concentrate is the carrier. Suitable carriers are polymers that are liquid at room temperature, i.e., below about 30° C., such as certain polyesters. The boiling point of the carrier should be sufficiently high so that it does not boil under the conditions to which it will be exposed, for example, melt spinning of polyamide polymers. Thus, the preferred boiling point of the carrier is at least about 300° C., more preferably above about 325° C., most preferably above about 350° C. Because the carriers are liquid at ambient temperatures they do not need to be heated in order to present them to the molten host polymer stream. Energy is therefore conserved compared to conventional concentrates which commonly use polyolefins as a carrier. Safety problems associated with handling hot materials are avoided, too. Carriers useful in the present invention include esters having four or more carbons per diacid in an alkyl diacid monomer and two or more carbons in a diol monomer, where the acid and the diol portions can be linear or branched, so long as the molecular weight is be high enough to produce a sufficiently high boiling point (low vapor pressure)and but low enough for a sufficiently low melt temperature. Suitable carriers include alkyl polyesters (such as those derived from 1,4-cyclohexane dicarboxylic acid; 1,8-octanoic acid; methylpentanedioic acid; and 4-ethyladipic acid); polycaprolactone and poly (adipate ester)s such as Piothane® esters from Pioneer Plastics of Auburn Me., and other polycondensate polymers that are liquid at room temperature. The presently preferred carrier is polycaprolactone.

Concentrate Preparation

Another aspect of the present invention is embodied in a process for making a $TiO_2$ concentrate. The process of the present invention prepares a concentrate system which is a dispersion or solution of $TiO_2$ in a non-aqueous liquid polymeric carrier. Because the solid is dispersed directly into the carrier, substantial efficiencies are obtained through the process of present invention in contrast to prior art processes which required pre-dispersing the solid into a dispersed phase and then into the carrier. Additionally, the present invention provides an excellent dispersion without being milled. Thus, the milling step may be eliminated which both reduces the complexity of the production process (i.e., one less step) and obviates the challenges of cleaning a non-aqueous dispersion out of a bead mill.

In the present invention, the $TiO_2$ is dispersed directly into the low melt-temperature polymer carrier with or without a dispersant. The dispersant, if desired in the concentrate system of the present invention, may be added before or after the $TiO_2$. A high-shear mixer (e.g., a Henschel FM series mixer available commercially from Henschel Mixers America, Inc. of Houston, Tex.) is preferably, but not essentially, used. The carrier and the $TiO_2$ are mixed in the high-intensity mixer until they are intimately mixed.

The concentrate is then in the form of a flowable or pumpable paste The viscosity and pigment loading of the concentrate should be balanced to achieve commercially manageable results for the target $TiO_2$ in the end product. In general, high loading of $TiO_2$ is preferred. The maximum manageable viscosity will depend upon the equipment being used to introduce the concentrate into the host. The maximum viscosity currently contemplated for gravity feed is about 50,000 cP at 25° C., preferably less than about 10,000 cP at 25° C., and more preferably 5,000 or less at 25° C. For pressure driven feed the currently contemplated upper viscosity limit is about 500,000 at 25° C., but preferably the viscosity will be less than about 100,000 cP at 25° C. Thus, the concentrate viscosity during introduction into the polymeric host material of will be up to about 500,000 cP, and more preferably up to about 100,000 cP, at a temperature between about 20° C. to about 200° C. The preferred lower limit of viscosity in this temperature range is about 500 cP, but more preferably about 1,500 cP.

Filament Production

The concentrate pastes of the present invention can be used to introduce $TiO_2$ to any of the host of materials to which $TiO_2$ is currently added. For example, the concentrate of the present invention can be used to introduce $TiO_2$ into thermoplastic molding operations or filament extrusion. Filament extrusion will be used as exemplary of the uses to which the present invention may be put. In a filament spinning operation additive concentrate systems may selectively be mixed with a melt flow of polymeric host material discharged from a conventional screw extruder and supplied to an inlet of the spin pack assembly. More specifically, the polymer host material is introduced into an upstream polymer filter section of a spin pack assembly before being extruded through orifices in a spinneret to form $TiO_2$-containing filaments. In one aspect of the use of the present invention, prior to reaching the spinneret, the polymeric host material may be distributed by a plurality of thin distribution plates in accordance with U.S. Pat. No. 5,162,074 to William H. Hills, which may or may not have one or more static mixing plates, for example, as disclosed in U.S. Pat. No. 5,137,369 to John A. Hodan.

It is envisioned that the $TiO_2$ concentrate paste of the present invention might be used alone or combined with other additive concentrate pastes. The paste of the present invention may be maintained under constant agitation and so might the other pastes that are to be used with it. In order to accomplish this, each of the tanks containing the pastes is maintained under constant agitation in order to prevent sedimentation of the pigment therein. Such agitation may be accomplished by a motor-driven mixer and/or via recycle lines.

Metering pumps can be used to supply the $TiO_2$ paste of the present invention from the tank (or other container) to the extrusion and spinning equipment. If desired, the metering pumps may be variable speed to achieve variable volumetric outputs within their respective capacity ranges. The speed of the metering pumps is most preferably controlled by a logic programmable controller LPC. Specifically, for a given "recipe" (for example, a desired final $TiO_2$ concentration in the extruded filaments) input into the controller LPC, appropriate outputs will be issued to the appropriate metering pump(s) to cause them to operate at a speed to achieve a desired volumetric output for their particular dispersible additive. Thus, by selectively controlling the operation of the metering pumps and, when operated, their respective speed (and hence their respective volumetric outputs), selective volumetric paste doses can be continuously supplied to the spin pack assembly where the $TiO_2$ concentrate paste (and other pastes depending on the desired end product) will be homogeneously mixed with the melt flow of polymeric host material being fed by the extruder.

The $TiO_2$ concentrate pastes of the present invention may be added at any point upstream from the spinneret provided that sufficient mixing with the host polymer is accomplished. For example, the $TiO_2$ may be introduced directly into the spin pack assembly at a location corresponding to the distribution/mixing section, that is, at a location downstream of the polymer filter, but upstream of the spinneret. One advantage of downstream addition in this manner, is that relatively quick change between successive batches of filaments is possible (i.e., to allow for changes in the amount of $TiO_2$ desired from one filament batch to another). In addition, such an inlet location for the additive concentrates also allows for a wide range of processing flexibility to be achieved. For example, the $TiO_2$ concentrate paste may be mixed with the entirety of polymeric host material so that all of the filaments have the same degree of $TiO_2$. Alternatively, the distribution/mixing section of the spin pack assembly may be so provided to split the flow of polymeric host material with the $TiO_2$ concentrate paste being mixed with one or more of such split flows to achieve differing amounts of $TiO_2$ in the separated groups of filaments. In addition, several other additives may be mixed with the host polymer.

Although the above description describes the $TiO_2$ concentrate paste being introduced into the melt flow of polymeric host material directly into the spin pack assembly at a location between the polymer filter section and the spinneret, it will be understood that the paste may be incorporated into the melt flow of polymeric host material at any location upstream of the spinneret. Thus, for example, the $TiO_2$ paste may be incorporated into the melt flow of polymeric host material by feeding through an injection port associated with the extruder or elsewhere in the spin beam, so that the paste may be introduced to the polymeric host material anywhere from the extruder throat to a point upstream of the spinneret.

The following non-limiting examples will provide a further understanding of this invention. In the examples, as elsewhere in this application, all percentages are by weight unless otherwise indicated.

INVENTION EXAMPLE 1

Paste Preparation

In a Henschel FM-10 mixer, 3600 grams titanium dioxide (LO-CR-SM from Sachtleben Corp.), 300 grams of a polyoxypropylene-polyoxyethylene block copolymer surfactant (Pluronic® 25R2) and 2100 grams of polycaprolactone (Tone™ Polyol 0201 from Union Carbide) are blended together for about 30 minutes. The tip speed on the mixer is 40 meters/second. The particle size of the resulting concentrate paste is measured using a Coulter LS230 optical bench. The particle size distribution is presented in Table 1. No particles are above 0.5 microns in diameter. The viscosity of the concentrate was about 10,000 cP at 25° C.

TABLE 1

Particle Size Distribution

| Particle size (microns) | % particle population larger than specified particle size |
|---|---|
| 0.05 | 100 |
| 0.1 | 100 |
| 0.5 | 4.68 |
| 1 | 0 |
| 2 | 0 |
| 5 | 0 |

EXAMPLE 2

Filament Production

The concentrate of Example 1 was blended with tan, red and black pigment pastes, which pastes were prepared as described in U.S. Pat. No. 5,834,089 to Jones et. al, to make a beige concentrate. The concentrate had a viscosity of 10,000 cP. The concentrate was placed in a vessel equipped with a lid, and an "O-ring" maintained a seal between the lid and vessel body. Six inches of ½" diameter tubing conveyed paste from a 6" diameter by 8" deep stainless-steel vessel. Ninety psi air pressure was applied to help overcome the pressure-drop between the vessel and the pump inlet. Due to the relatively short duration of the run, no agitation was used.

A Mahr/Feinpruf 1.2 cc/revolution pump was used to feed the concentrate blend from the vessel at ambient temperature into the throat of a Barmag 4E extruder along with nylon polymer chip. The concentrate was mixed with the nylon-6 polymeric host material.

The output of this extruder was commingled with a portion of the output of a Barmag 9E extruder, and that pigment/polymer blend was fed to a spinning position at 2×308 grams/minute (308 grams/minute for each spin pack, with two packs per position) to obtain about 0.4 wt. % pigment (of which 0.3 wt. % was $TiO_2$) in the resulting melt-spun filaments. The output of the spinneret was fed to a Rieter take-up device. The resulting melt-spun filament yarns were trilobal cross-section, 1288+/−40 denier, and 58 filaments/end.

What is claimed is:

1. A flowable titanium dioxide paste composition consisting essentially of:
   (a) a polymeric carrier that is a liquid below about 25° C. and which has a molecular weight sufficient for the carrier to exhibit a boiling point of at least about 300° C., wherein said polymeric carrier is at least one selected from the group consisting of (i) polycaprolactone, (ii) poly(adipate ester), and (iii) alkyl polyesters derived from an alkyl diacid monomer which is at least one selected from the group consisting of 1,4-cyclohexane dicarboxylic acid, 1,8-octanoic acid, methylpentanedioic acid and 4-ethyladipic acid, and a diol monomer having two or more carbon atoms;
   (b) titanium dioxide particles dispersed in the polymeric carrier in an amount of at least about 55% by weight to about 70% by weight sufficient to achieve a viscosity of the composition which is in the range of about 500 cP to about 500,000 cP at a temperature of about 25° C.;
   (c) from 0 to about 5% water by weight of said composition; and
   optionally,
   (d) one or more dispersants.

2. The composition of claim 1, wherein said titanium dioxide particles are present in an amount between about 60% by weight to about 70% by weight of said composition.

3. The composition of claim 1, wherein said water does not exceed about 5% by weight of said composition.

4. The composition of claim 2, wherein said water does not exceed about 2% by weight of said composition.

5. The composition of claim 1 wherein the carrier is polycaprolactone.

6. The composition of claim 1, having a viscosity less than about 10,000 cP at about 25° C.

7. The composition of claim 6, having a viscosity less than about 5000 cP at about 25° C.

8. The composition of claim 1, wherein the dispersant is selected from the group consisting of:
   ethoxylated fatty alcohols;
   polyoxypropylene/ethylene block copolymers;
   ethoxylated nonylphenol;
   (polyethylene glycol) p-octyl phenyl ether;
   alkoxylated diamines;
   sodium lauryl sulfate; and
   cationic dispersants.

9. The composition of claim 1 wherein the $TiO_2$ has a mean particle size not exceeding about 6 microns.

10. A method of making a flowable titanium dioxide paste concentration comprising dispersing an amount between about 55 % by weight to about 70% by weight $TiO_2$ particles having a mean particle size not exceeding 6 microns into a polycaprolactone carrier that is a liquid below about 25° C. and optionally, one or more dispersants, sufficient to form a flowable $TiO_2$-containing paste having a viscosity of about 500 cP to about 500,000 cP at a temperature of about 25° C.

11. The method of claim 10, wherein the $TiO_2$ is present in an amount up to about 60% by weight of said concentrate.

12. The method of claim 10, wherein the concentrate has a viscosity of less than about 10,000 cP at about 25° C.

13. The method of claim 12, wherein the concentrate has a viscosity less than about 5,000 cP at about 25° C.

14. A method of making filaments containing titanium dioxide particles comprising the steps of:
   (a) supplying a melt flow of a melt-spinnable polymeric host material to spinneret orifices;
   (b) incorporating within at least a portion of the melt flow of polymeric host material upstream of the spinneret orifices, a flowable paste concentrate consisting essentially of (i) a polymeric carrier that is a liquid below about 25° C. and which has a molecular weight sufficient for the carrier to exhibit a boiling point of at least about 300° C., wherein said polymeric carrier is at least one selected from the group consisting of (1) polycaprolactone, (2) poly(adipate ester), and (3) alkyl polyesters derived from an alkyl diacid monomer which is at least one selected from the group consisting of 1,4-cyclohexane dicarboxylic acid, 1,8-octanoic acid, methylpentanedioic acid and 4-ethyladipic acid, and a diol monomer having two or more carbon atoms, (ii) titanium dioxide particles dispersed in the carrier in an amount of at least about 55% by weight to about 70% by weight sufficient to achieve a viscosity of the concentrate which is in the range of about 500 cP to about 500,000 cP at a temperature of about 25° C.; (iii) less than 5% by weight water and, optionally, (iv) a dispersant, to form a mixture of the polymeric host material and the titanium dioxide particles; and then (c) extruding a melt of the mixture through the spinneret orifices to form filaments containing titanium dioxide.

15. The method of claim 14, wherein said concentrate is supplied to a spin pack assembly upstream of the spinneret orifices and is mixed with at least a portion of the melt flow of polymeric host material within the spin pack assembly prior to the mixture being extruded through the spinneret orifices.

16. The method of claim 14, wherein the concentrate has a viscosity not exceeding about 10,000 cP at a temperature of about 25° C.

17. The method of claim 16, wherein the concentrate has a viscosity not exceeding about 5,000 cP at a temperature of about 25° C.

18. The method of claim 14, wherein said polymeric host material is selected from the group consisting of: polymers, copolymers and mixtures of polyamides, polyesters, polyolefins and polyurethanes.

19. The method of claim 18, wherein the polymeric host material is nylon-6.

20. The method of claim 14, wherein the carrier has a boiling point of at least about 325° C.

21. The method of claim 20, wherein the carrier has a boiling point of at least about 350° C.

22. The method of claim 14, wherein the titanium dioxide has a mean particle size not exceeding about 6 microns.

23. The method of claim 14, wherein the titanium dioxide is present in an amount up to about 60% by weight of said concentrate.

24. A method of making titanium dioxide containing polymer compositions comprising the steps of:

(a) introducing a flowable paste concentrate consisting essentially of (i) a polymeric carrier that is a liquid below about 25° C. and which has a molecular weight sufficient for the carrier to exhibit a boiling point of at least about 300° C., wherein said polymeric carrier is at least one selected from the group consisting of (1) polycaprolactone, (2) poly(adipate ester), and (3) alkyl polyesters derived from an alkyl diacid monomer which is at least one selected from the group consisting of 1,4-cyclohexane dicarboxylic acid, 1,8-octanoic acid, methylpentanedioic acid and 4-ethyladipic acid, and a diol monomer having two or more carbon atoms, (ii) titanium dioxide particles dispersed in the carrier in an amount of at least about 55% by weight to about 70% by weight sufficient to achieve a viscosity of the concentrate which is in the range of about 500 cP to about 500,000 cP at a temperature of about 25° C.; (iii) from 0 to 5% by weight water and, optionally, (iv) a dispersant, into a polymeric host material; and (b) dispersing the concentrate into the polymeric host material to form a titanium dioxide-containing polymer composition.

25. The method of claim 24, wherein the concentrate has a viscosity not exceeding about 10,000 cP at a temperature of about 25° C.

26. The method of claim 25, wherein the concentrate has a viscosity not exceeding about 5,000 cP at a temperature of about 25° C.

27. The method of claim 24, wherein said polymeric host material is selected from the group consisting of: polymers, copolymers and mixtures of polyamides, polyesters, polyolefins and polyurethanes.

28. The method of claim 27, wherein the polymeric host material is nylon-6.

29. The method of claim 24, wherein the carrier is polycaprolactone.

30. The method of claim 24, wherein the titanium dioxide has a mean particle size not exceeding about 6 microns.

* * * * *